United States Patent
Kumar

(10) Patent No.: US 8,325,717 B2
(45) Date of Patent: Dec. 4, 2012

(54) METHOD AND SYSTEM FOR IP FRAGMENTATION HANDLING

(75) Inventor: Saurabh Kumar, San Mateo, CA (US)

(73) Assignee: Foundry Networks, LLC, San Jose, CA (US)

(*) Notice: Subject to any disclaimer, the term of this patent is extended or adjusted under 35 U.S.C. 154(b) by 1290 days.

(21) Appl. No.: 10/630,494

(22) Filed: Jul. 30, 2003

(65) Prior Publication Data

US 2010/0150148 A1 Jun. 17, 2010

(51) Int. Cl.
H04L 12/28 (2006.01)
H04L 12/56 (2006.01)
H04L 12/54 (2006.01)
G06F 15/16 (2006.01)

(52) U.S. Cl. ......... 370/389; 370/394; 370/428; 709/236
(58) Field of Classification Search ................... 370/351, 370/428, 429, 389, 394; 709/236
See application file for complete search history.

(56) References Cited

U.S. PATENT DOCUMENTS

| | | | | |
|---|---|---|---|---|
| 5,870,394 A * | 2/1999 | Oprea | ........................... | 370/392 |
| 6,026,093 A * | 2/2000 | Bellaton et al. | ............... | 370/412 |
| 6,337,861 B1 * | 1/2002 | Rosen | ........................... | 370/389 |
| 6,425,080 B1 * | 7/2002 | Sugahara | ...................... | 713/154 |
| 6,453,357 B1 * | 9/2002 | Crow et al. | .................... | 709/236 |
| 6,574,195 B2 | 6/2003 | Roberts | | |
| 6,714,985 B1 * | 3/2004 | Malagrino et al. | ............ | 709/236 |
| 6,731,631 B1 * | 5/2004 | Chang et al. | .................. | 370/388 |
| 6,795,866 B1 * | 9/2004 | Mankude et al. | ............ | 709/238 |
| 6,798,788 B1 * | 9/2004 | Viswanath et al. | ........... | 370/469 |
| 6,944,672 B2 * | 9/2005 | Crow et al. | .................... | 709/236 |
| 7,016,352 B1 * | 3/2006 | Chow et al. | ................... | 370/392 |
| 7,065,086 B2 * | 6/2006 | Basso et al. | .................... | 370/394 |
| 7,089,486 B1 * | 8/2006 | Marleux et al. | ............... | 714/807 |
| 7,245,616 B1 * | 7/2007 | Elnathan et al. | .............. | 370/389 |
| 7,349,437 B2 * | 3/2008 | Horton et al. | ................. | 370/474 |
| 7,372,864 B1 * | 5/2008 | Reast et al. | .................... | 370/428 |
| 7,760,737 B2 * | 7/2010 | Rana et al. | ..................... | 370/394 |
| 2002/0061030 A1 * | 5/2002 | Iny | ................. | 370/449 |
| 2002/0141448 A1 * | 10/2002 | Matsunaga | ................... | 370/469 |
| 2002/0150100 A1 * | 10/2002 | White et al. | .................. | 370/392 |
| 2003/0039248 A1 * | 2/2003 | Weaver | ......................... | 370/392 |
| 2003/0048793 A1 * | 3/2003 | Pochon et al. | ................ | 370/401 |

(Continued)

OTHER PUBLICATIONS

"Internet Protocol DARPA Internet Program Protocol Specification," prepared by Information Sciences Institute University of Southern California, Sep. 1981; pp. 1-49.

(Continued)

*Primary Examiner* — Xavier Szewai Wong
(74) *Attorney, Agent, or Firm* — Graybeal Jackson LLP

(57) ABSTRACT

In a network, packets are fragmented into head and non-head fragments. Non-head fragments are saved up front at an entry point, while a network switch forwards only the head fragment to Layer 4-Layer 7 (L4-L7) features for processing. The switch records changes that are performed on the head fragment's fields by the L4-L7 features while they process the head fragment. At an exit point, fields of the saved non-head fragments are overwritten with information that was recorded for the head fragment. This can include updating or modifying the source and destination parameters of the non-head fragments in an intelligent manner by reusing the results of the packet processing that was performed on the head fragment. This fragmentation handling technique avoids having to redundantly process the non-head fragments in the same manner as the head fragments.

29 Claims, 4 Drawing Sheets

U.S. PATENT DOCUMENTS

2003/0081605 A1* 5/2003 Egevang ........................ 370/392
2004/0093425 A1* 5/2004 Thomas ........................ 709/236

OTHER PUBLICATIONS

Compatible Systems Corporation Tech Notes, "IP Fragmentation and MTU Path Discovery with VPN," copyright 1992-2001, Cisco Systems Inc.

Cisco-IP Fragmentation and PMTUD, "IP Fragmentation and PMTUD," copyright 1992-2002, Cisco Systems Inc.

Catalyst 2820 Modules User Guide, "Packet Translation", pp. C1-C8.

Software Configuration Guide—Release 5.4, "Configuring FDDI/CDDI Switching", pp. 38-1-38-18.

* cited by examiner

METHOD AND SYSTEM FOR IP FRAGMENTATION HANDLING

BACKGROUND OF THE INVENTION

1. Field of the Invention

This disclosure relates generally to communication of packets within a network. More particularly but not exclusively, the present disclosure relates to techniques for handling fragmented packets, such as the handling of Internet protocol (IP) fragmentation packets within a communication network.

2. Description of the Related Art

The most basic unit of data transmission in Transmission Control Protocol/Internet Protocol (TCP/IP) or Internet networking is a packet (sometimes referred to as a "datagram"). A packet is a small piece of information coded at a source, marked with the source address (SA), and directed to a destination address (DA). Traditional IP networks and systems rely exclusively on IP addressing to route the packet from one IP network to another, until arriving at the destination address specified in the packet. Routers, switches (such as Ethernet switches), hubs, or other network devices operate to forward packets to their ultimate destination.

IP fragmentation of a packet is generally performed when the packet originates from a network that allows a large packet size, and then the packet must traverse to another network that limits packets to a smaller size in order to reach their destination. Routers typically perform the fragmentation of large packets, while reassembly of fragments back into the original packet is performed at the destination (or sometimes at an intermediate location).

Fragmentation involves the breaking up of a packet into an almost arbitrary number of fragments that can be later reassembled. The SA, DA, identification, total length, fragment offset fields, and other information in an IP packet header are used for fragmentation and reassembly. The receiving destination uses an IP identifier in the identification field to identify and match fragments that belong to the same packet, while the fragment offset fields are used to identify the position of each fragment in the original packet. This header information, along with other header information, provides sufficient information to reassemble packets. See generally Information Services Institute, Internet Protocol: DARPA Internet Program Protocol Specification, September 1981.

When dealing with IP-fragmented packets, the only fragment that has sufficient information that can be utilized by Layer 4-Layer 7 (L4-L7) features (at the receiving station or at intermediate locations, such as at a switch) is the head fragment that has all of the header information. The trailing fragments, including fragments that collectively contain the pieces of the original packet data, are generally useless for purposes of L4-L7 operations. Therefore, processing all of these packets with the L4-L7 features amounts to wasting precious processor cycles. Furthermore, in fragmentation schemes where the header information is duplicated into all of the individual fragments (as compared to fragmentation schemes where only one fragment generally has most of the original header information), processing all of the individual fragments with the L4-L7 features also amounts to a redundant and an unnecessary waste of processor cycles.

As an illustration of this redundancy, suppose an IP packet "P" is fragmented into n+1 fragments f0, f1, f, . . . fn. The only fragment that will have any utility for the L4-L7 features is the head fragment f0. In the worst case scenario, the head fragment f0 is received last by a switch (or by some other network component in the communication path)—however, by the time the head fragment f0 is received, the switch would already have forwarded the previous n fragments to the L4-L7 features by then, and the L4-L7 features (whether at the switch, at the receiving station, or at an intermediate location) would already have processed these n fragments before receiving the head fragment f0. The L4-L7 features, only after processing these n fragments, would then realize that these are fragments of an original packet and that there is not sufficient useful information that can be obtained therefrom, and further would have to save these n fragments until the head fragment f0 is finally received and processed. However, as one can note, the L4-L7 features performed substantially unnecessary processing on the n non-head fragments prior to receipt of the head fragment f0.

BRIEF SUMMARY OF THE INVENTION

One aspect of the present invention provides a method that includes receiving packet fragments at an entry point. The method determines if a packet fragment received at the entry point is a head fragment or a non-head fragment. If the received packet fragment is a non-head fragment, the method determines if a helper session associated with a head fragment corresponding to the non-head fragment is present, updates the non-head fragment with routing information from the helper session, and forwards the non-head fragment based on the routing information from an exit point. Otherwise, the method stores the non-head fragment if the helper session is not present, and waits for the corresponding head fragment to be received at the entry point.

If the received packet fragment is the head fragment, the method processes the head fragment. At the exit point, the method updates any stored corresponding non-head fragment with routing information obtained as a result of processing the head fragment and forwards the updated non-head fragment from the exit point.

BRIEF DESCRIPTION OF THE SEVERAL VIEWS OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
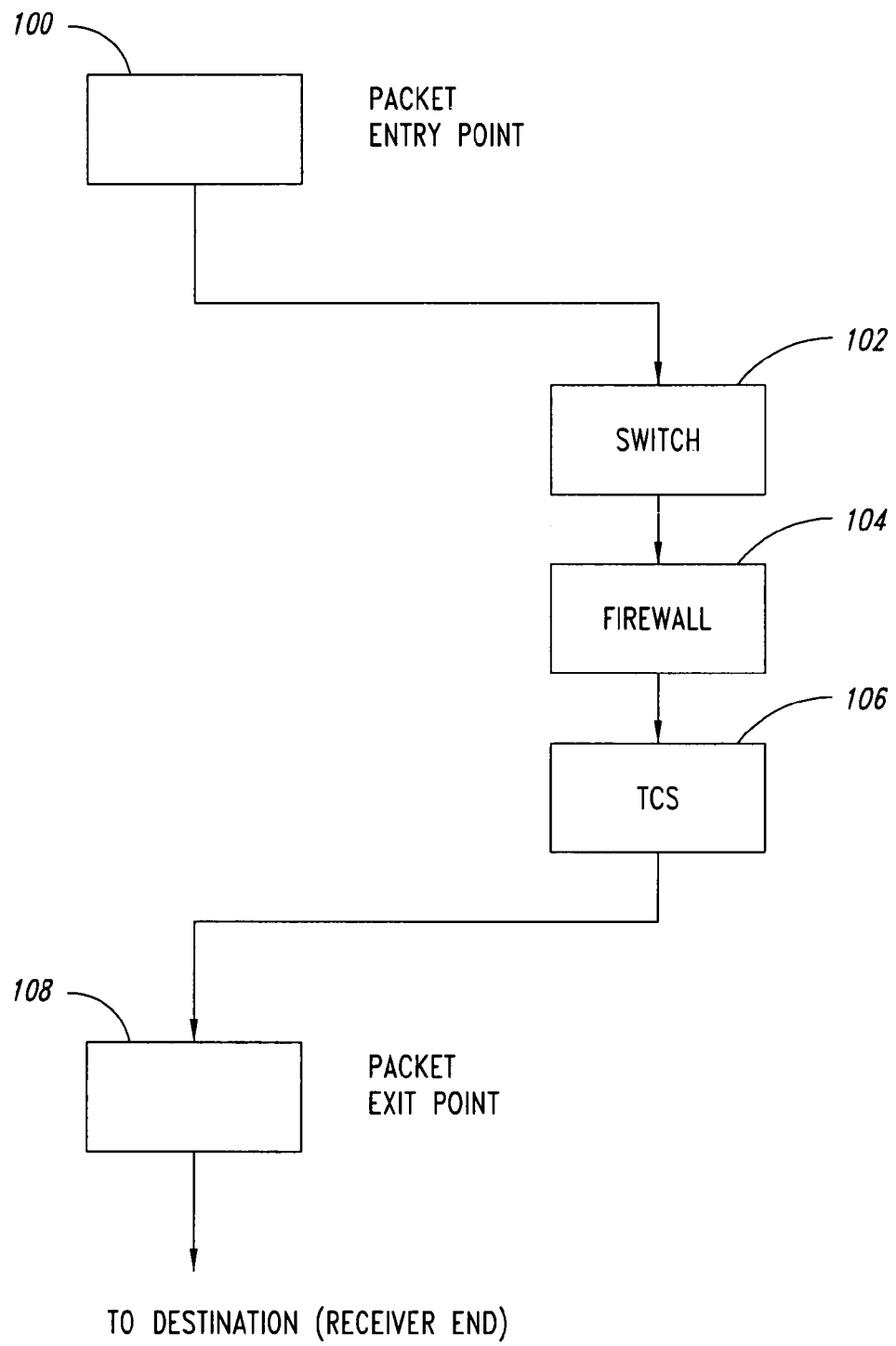
FIG. 1 is a block diagram that illustrates a technique to handle fragmented packets.

Embodiments of techniques to handle fragmentation of packets, such as

Internet protocol (IP) packets, are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the invention reduces the wastage of processor cycles by saving non-head fragments and forwarding only the necessary packets (e.g., head fragments) to L4-L7 features. In an embodiment, non-head fragments are saved right in the beginning, when a network device (such as a switch) receives the fragments at an entry point. The switch waits for a head fragment to arrive, and once it is received, the switch then forwards the head fragment to the appropriate L4-L7 feature(s). The switch records changes that are performed on the head fragment's fields by the L4-L7 features while they process the head fragment. At an exit point, fields of the saved non-head fragments are overwritten with information that was recorded for the head fragment. That is, an embodiment of the invention modifies the source and destination parameters of the non-head fragments in an intelligent manner by reusing the results of the packet processing that was performed on the head fragment. Hence, all of the fragments can be forwarded to the correct destination for subsequent reassembly—complex computation associated with reassembly is left to the endpoint destination, thereby further saving processor cycles at the switch.

Such a technique may be viewed as a form of "global fragmentation handling." That is, rather than having the L4-L7 features process each and every fragment (both head and non-head fragments) in substantially a similar way, an embodiment processes only the head fragment and the results of that processing are applied to all the non-head fragments, without having to independently process each of the non-head fragments. Furthermore, an embodiment of the invention provides a technique where the processing performed by the L4-L7 features is substantially fragmentation independent. That is, the L4-L7 features need not and do not make any processing decisions that are dependent on the nature of the IP fragments (e.g., the L4-L7 features do not need to determine whether the fragment is a head or non-head fragment, the relative location of the fragment in the original packet, the number of fragments that are needed to form the complete packet, and so forth). By forwarding the head fragment to the L4-L7 features and saving (and not forwarding the non-head fragments), the L4-L7 features can simply process the head fragment without having to account for fragmentation issues.

While embodiments are described herein in the context of IP packets and the ISO layer model, it is to be appreciated that the invention is not specifically limited to IP packets and this model. Embodiments of the invention may be implemented in other types of systems where data is fragmented, and need to be processed and reassembled in an efficient manner.

FIG. 1 is a block diagram that illustrates a technique to handle fragmented packets. Packets (or more particularly, fragments of packets) are received at one or more packet entry points 100. Both head and non-head fragments traverse through the entry point(s) 100. A network device, such as a switch 102, receives the fragments. The switch 102 operates as an "edge device" that processes IP traffic on behalf of an endpoint of a TCP/IP communication path (where traffic to the endpoint is indicated generally in FIG. 1 by an arrow from a packet exit point 108 to a destination or a receiver end).

The processing performed by the switch 102 can include processing associated with Layer 2 (L2), Layer 3 (L3), or L4-L7. For instance, L4 processing can include port-based mapping using source and destination address information, while L5-L7 processing can include session-based, geography-based, username-based, etc. processing, which for the sake of brevity are not described in detail herein because such details would be familiar to those skilled in the art having the benefit of this disclosure.

A firewall 104 may be present to filter or manipulate packets (or fragments) based on L4-L7 information. One or more other network devices, such as a transparent cache switching (TCS) device 106, may also be present to direct, store, or otherwise process packets (or fragments) based on L4-L7 information. Another example of a network device (alternatively or in addition to the TCS device 106) is a context switch engine.

The firewall 104 and TCS device 106 are shown in FIG. 1 merely as examples of L4-L7 components or features. Other types of L4-L7 features may be implemented in the TCP/IP communication path. Moreover, the switch 102 itself may have its own L4-L7 features integrated therein to perform processing associated with L4-L7. An example of the switch 102 (having L4-L7) features is the ServerIron® product available from Foundry Networks, Inc. of San Jose, Calif.

In the fragmentation-handling technique of FIG. 1, whenever a fragment arrives at the entry point 100, the fragment is treated just like a normal packet by the switch 102 and is forwarded to the appropriate L4-L7 feature(s) (such as the firewall 104, TCS device 106, and/or L4-L7 features integrated in the switch 102) based on a Media Access Control (MAC) address lookup. The received fragment is either a head or non-head fragment. The L4-L7 feature(s) create(s) a special helper session when the switch 102 receives the head fragment. The index for this helper session is the IP Identifier, which is common to all of the fragments that constitute the original IP packet.

Any other fragment with the same IP identifier that is received via the entry point 100 after the creation of this helper session is processed immediately—and thus, these non-head fragments undergo a redundant L4-L7 processing that was previously performed on the head fragment. If the switch 102 has not yet received the head fragment, then the helper session is not yet available, and all the currently received non-head fragments are stored in an array until the head fragment is received. On the arrival of the head fragment, the helper session is created by the L4-L7 feature(s), which then perform L4-L7 processing on all of the fragments currently stored in the array. In case the head fragment is not received for some reason, the stored fragments are aged out after a period of time.

Figure 2:
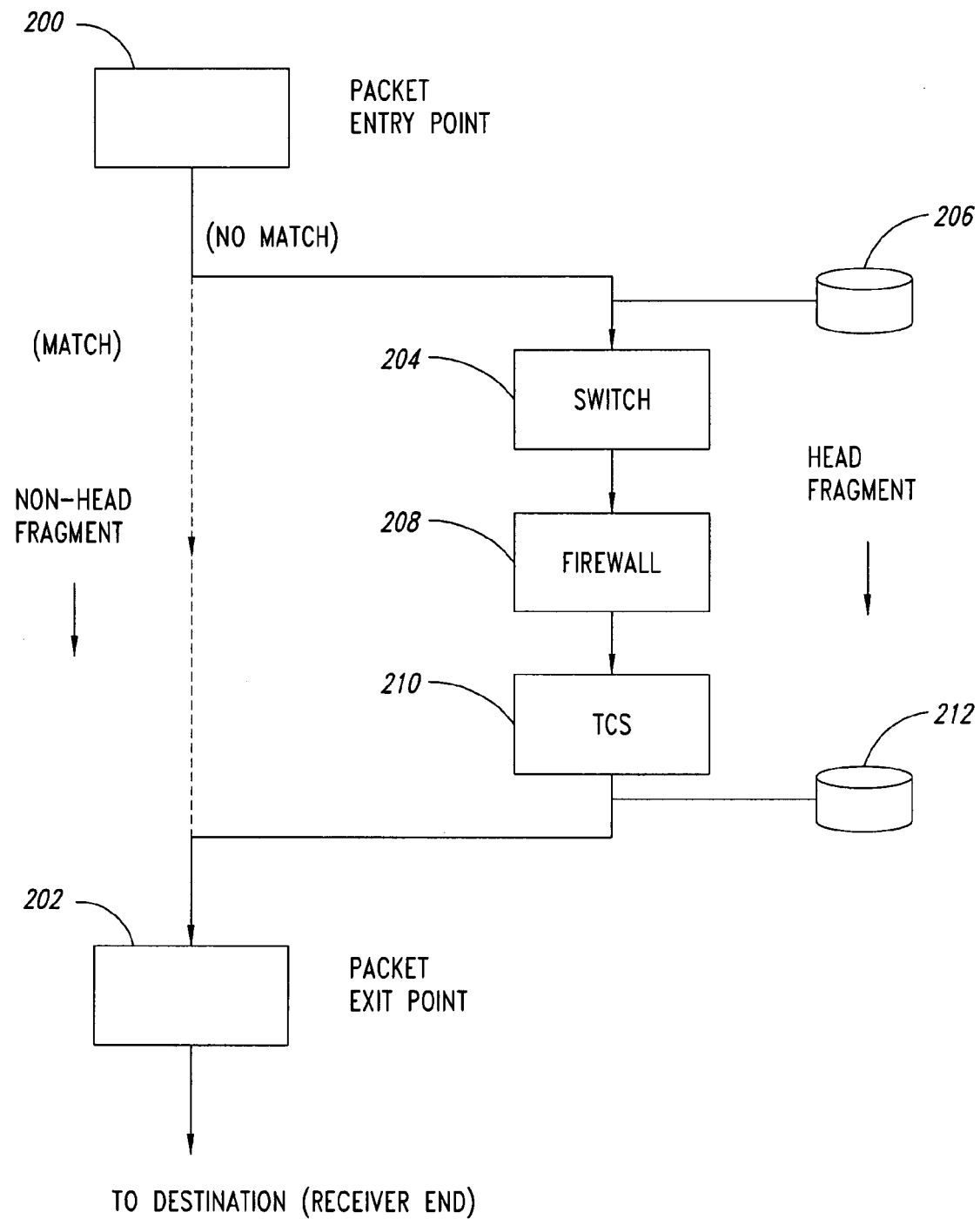
FIG. 2 is a block diagram that illustrates a technique to handle fragmented packets according to an embodiment of the invention.

FIG. 2 is a block diagram that illustrates a technique to handle fragmented packets according to an embodiment of the invention, and is to be contrasted and compared with the technique of FIG. 1. More particularly, FIG. 2 illustrates that the head fragment is forwarded to and processed by the L4-L7 features and the non-head fragments are saved in the meantime (and not redundantly processed by the L4-L7 features in the same manner as the head fragment), while FIG. 1 illustrates that all packets (whether head or non-head packets) are processed by the L4-L7 features.

In an embodiment, an entry point 200 and an exit point 202 are chosen to ensure that all packets (or fragments thereof) traverse through those two points. At the entry point 200, a fragment is checked to determine if it is a non-head fragment. For non-head fragments, software or other machine-readable instructions at a switch 204 determines if there is any helper session (or other session provides routing information) that is already present and that matches (or can otherwise be associated to) the non-head fragment. Such software can be stored on a machine-readable storage medium 206 or other suitable storage location accessible by the switch 204, which itself can be implemented using the ServerIron® product of Foundry Networks, Inc. in an embodiment.

If there is an existing helper session that matches the non-head fragment, then a routing tag or other suitable routing information is attached to the non-head fragment to ensure that the non-head fragment is forwarded to the same destination as its corresponding head fragment. Address fields in the non-head fragment may also be updated with a port or other destination address if needed. IP and TCP/UDP check sums are also modified accordingly. Information for the routing tag can include a destination port, MAC, and/or IP address, which can be obtained from a session pointer data structure in the helper session in one embodiment. The non-head fragment itself therefore does not undergo L4-L7 processing and is instead directly forwarded by the switch 206 to the exit point 202, as symbolically represented in FIG. 2 by a broken line.

In an embodiment, a "helper session" from above is a session that is created to store the forwarding information for the packet or fragment thereof. One helper session can be created per head fragmented packet. The index into this session is the tuple (src_ip, dst_ip, ip_identifier, ip_idenffier, ip_protocol), for example. The non-head fragments will have the same tuple in their header and can thus refer to the forwarding information that is stored in the helper session. These helper sessions are short-lived, so as to avoid running out of session entries in case of a large number of fragmented packets. Most of the fragments arrive within a short interval, and therefore, a helper session can be freed within 8 seconds in an example implementation.

The session pointer data structure (session_ptr) is an example implementation detail to refer to the session above. An illustration of the routing tag (or other routing information) is a forwarding index that maps to the outgoing port or ports. In one embodiment, the fragments are sent out based on a bit array, where each bit maps to individual ports. Depending on which bits are "on," the packets are sent out on those ports.

If there is no matching helper session at the entry point 200, the non-head fragment is saved or otherwise stored (such as in the storage medium 206), until the switch 204 receives its corresponding head fragment. When the head fragment arrives, the switch 204 forwards the head fragment to its respective L4-L7 features for packet processing just like any regular packet would otherwise be processed. Such L4-L7 feature(s) may be found in a firewall 208, in a TCS device 210, or in some other network device or combination thereof, including L4-L7 features integrated in the switch 204 itself. This L4-L7 processing can include assigning destination port addresses, identifying the session to which the head fragment belongs, translation of addresses, or other L4-L7 processing that would be familiar to those skilled in the art having the benefit of this disclosure and which are not described in further detail herein for the sake of brevity.

At the common exit point 202, an embodiment provides software to check if the fragment is a head fragment of a fragmented IP packet. Such software may be stored at a machine-readable medium 212. The machine-readable medium 212 can be located at the receiver end (such as at a client terminal); at the switch 204, or at any location in between, including being the same storage medium as the storage medium 206. The exit point 202 may also be similarly defined at the receiver end, at the switch 204, or at any location in between where fragments are routed subsequent to the L4-L7 processing.

In operation, after the L4-L7 processing is completed by the L4-L7 features, this software at the exit point 202 searches for the session pointer data structure that corresponds to the head fragment and which has now been created by the L4-L7 features during their packet processing, and creates the helper session. The forwarding information from this helper session is stored in the storage medium 212 in an embodiment, and includes information such as destination addresses, IP identifiers to match the head fragment with its non-head fragments, session identifiers, and other information. Using this stored information, the software processes any non-head fragments stored in the queue at the storage medium 206 and which are associated with this head fragment. Such processing can include overwriting fields in the non-head fragments with forwarding information (such as destination port addresses) that were obtained when their corresponding head fragment was processed by the L4-L7 features. These updated non-head packets are then forwarded to the receiving end for reassembly.

Therefore and as can be contrasted between the techniques of FIGS. 1-2, the technique of FIG. 1 performs L4-L7 processing on all of the fragments even after fragmentation-specific processing is performed, as opposed to the technique of FIG. 2 where fragmentation handling is performed after the L4-L7 feature is done with its packet processing on only the head fragment. This saves much redundant processing, since the results of the L4-L7 processing of a head fragment of FIG. 2 can be reused to minimally process non-head fragments.

Figure 3:
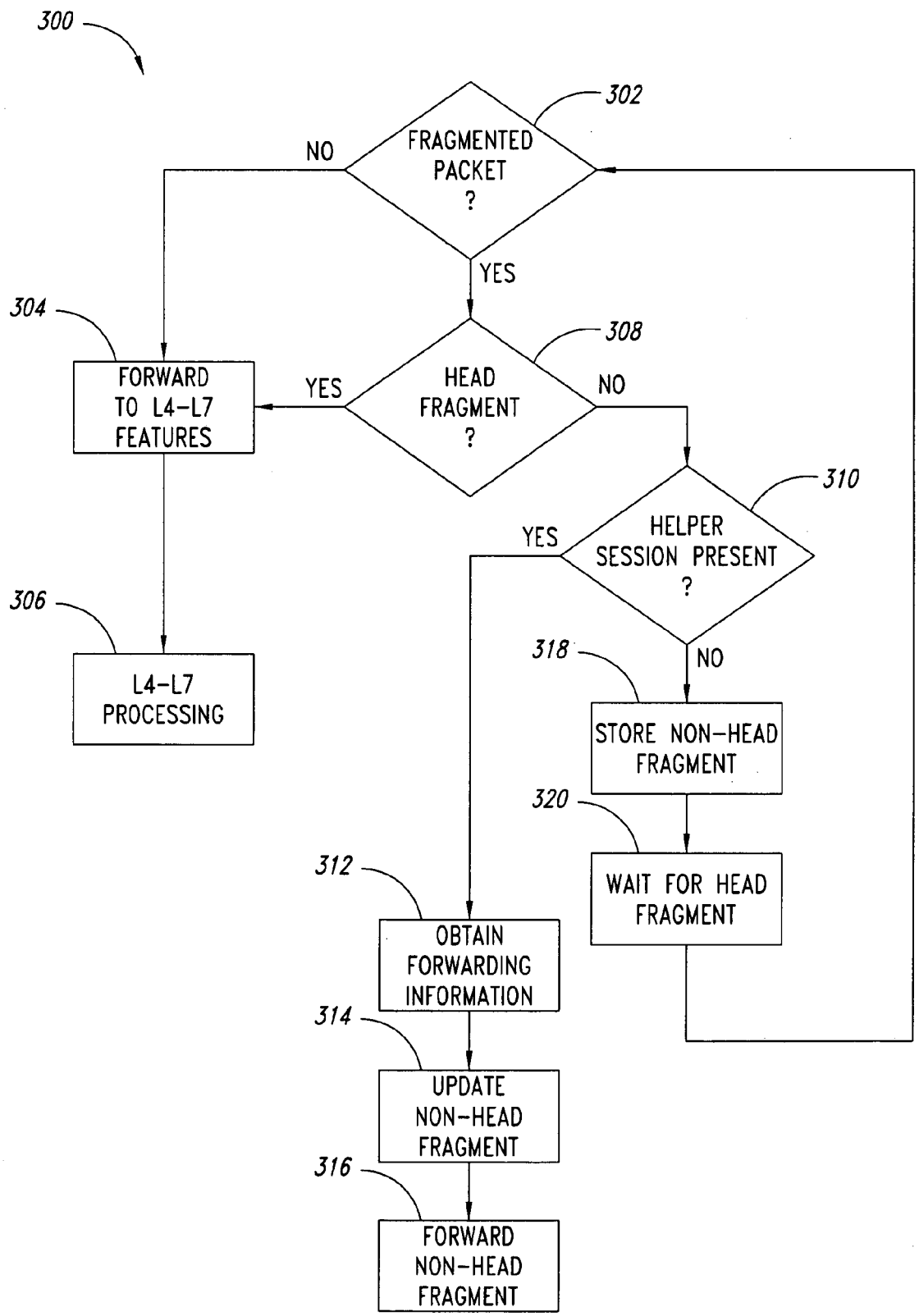
FIG. 3 is a flowchart of fragmented packet handling at an entry point according to an embodiment of the invention.

FIG. 3 is a flowchart 300 of fragmented packet handling at the entry point 200 according to an embodiment of the invention. Components of the flowchart 300 may be implemented in software or other machine-readable instruction stored on machine-readable medium (such as the storage medium 206). It is appreciated that the various operations depicted in the flowchart 300 need not necessarily occur in the exact order shown, and that certain operations may be combined, added, removed, or modified as appropriate.

At a block 302, packets and/or fragments thereof are received at the entry point 202. The entry point 202 may be defined in a software function of the switch 204, for instance, in a manner that all packets and/or fragments thereof traverse through the entry point 202. The software at the block 302 determines whether the packet is fragmented—in most cases, it is a fragment that is received at the entry point 200, unless some prior reassembly has already been performed prior to reaching the entry point 200. If the packet is not fragmented, then the packet is forwarded to the L4-L7 features by the switch 204 (if appropriate) at a block 304 and is processed by these features at a block 306.

If the packet is determined to be fragmented at the block 302, however, then a block 308 determines whether the received fragment is the head fragment. If the received fragment is the head fragment, then the head fragment is forwarded to the L4-L7 features at the block 304 and processed by these features at the block 306.

If the fragment is a non-head fragment as determined at the block 308, then the software attempts to locate any present corresponding helper session at a block 310. If such a helper session is present, then forwarding information is obtained from the session pointer data structure at a block 312. This forwarding information can include information for a routing tag, destination port address, or other information to associate the non-head fragment to its proper destination.

At a block 314, the non-head fragment is updated with the forwarding information. For example, the non-head fragment can be updated with a routing tag, destination port address can be overwritten into address fields, or other routing information or parameters can be updated. The updated non-head fragment is forwarded to its next destination at a block 316, which can be the final destination or an intermediate location.

If the helper session is not present at the block 310, then the non-head fragment is stored in the storage medium 206 at a block 318. The switch 204 waits for the head fragment at a block 320, and the process repeats at the block 302.

Figure 4:
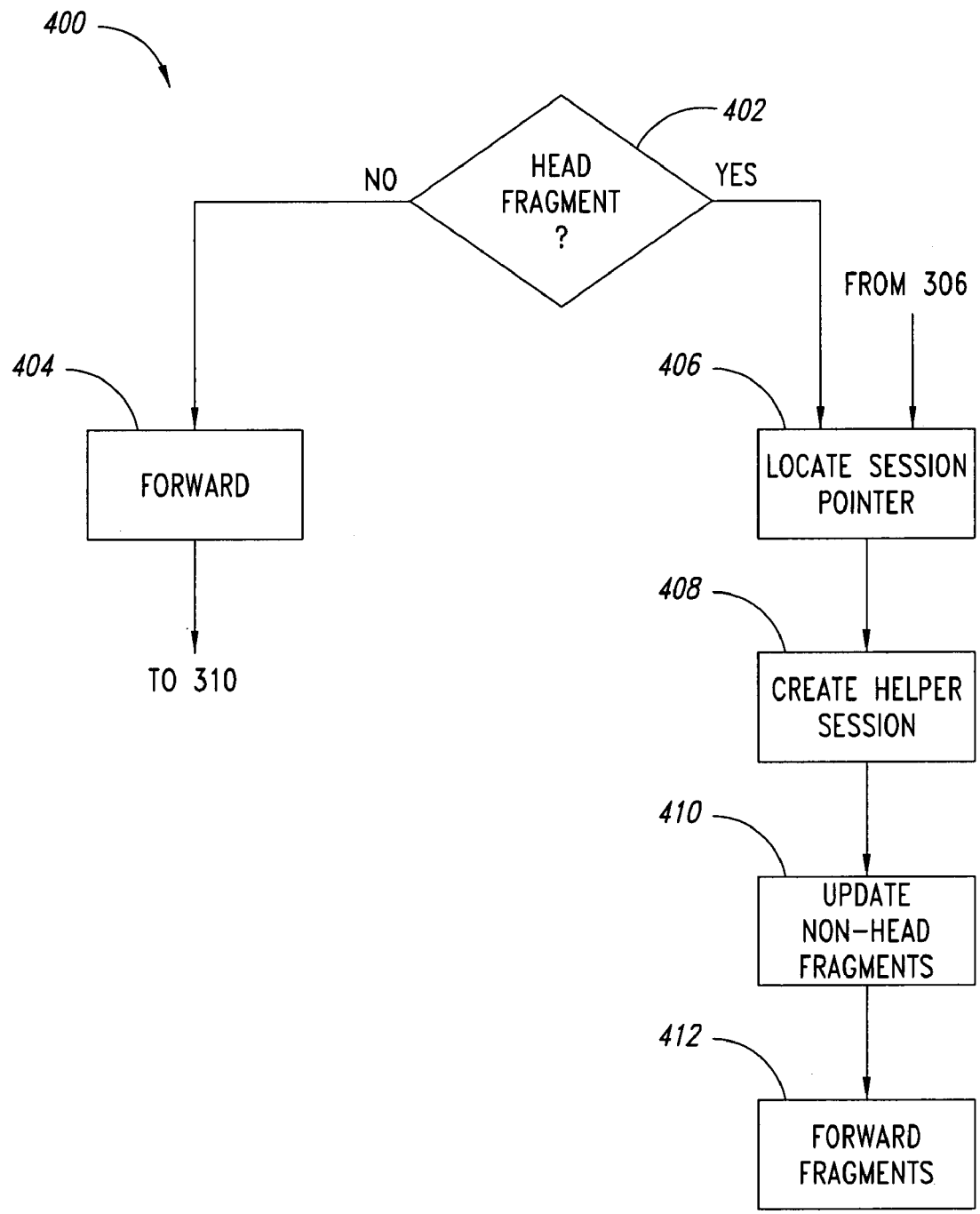
FIG. 4 is a flowchart of fragmented packet handling at an exit point according to an embodiment of the invention.

FIG. 4 is a flowchart 400 of fragmented packet handling at the exit point 202 according to an embodiment of the invention. As with the flowchart 300 of FIG. 3, components of the flowchart 400 may be implemented in software or other machine-readable instruction stored on machine-readable medium (such as the storage medium 212). It is also appreciated that the various operations depicted in the flowchart 400 need not necessarily occur in the exact order shown, and that certain operations may be combined, added, or modified as appropriate. It is further appreciated that components of the flowchart 400 may be combined with or added to the components of the flowchart 300.

At a block 402, the software determines whether a received fragment (or packet) is a head fragment. For example, if a non-head fragment or an un-fragmented packet is received at the block 402, then these are forwarded to their next destination at a block 404, which in one embodiment is the block 310 of FIG. 3. With regards to a non-head fragment, such a fragment may originate from the block 316 of FIG. 3, after this non-head fragment has been matched to a current session and has been updated accordingly as described above. With regards to an un-fragmented packet, such a packet may have been previously processed by the L4-L7 features at the block 306 of FIG. 3 and can now be forwarded at the block 404 to its next destination.

If a head fragment is received at the block 402, then this head fragment has been already processed at the block 306 of FIG. 3 by the L4-L7 features. The head fragment's corresponding non-head fragments are either or both stored at the storage medium 206 or waiting to be received at the entry point 200. In one embodiment at a block 406, the software locates the session pointer data structure associated with that head fragment. The session pointer data structure would have been created by this time by the L4-L7 features at the block 306, while packet processing the head fragment (as symbolically depicted in FIG. 4 by an arrow from the block 306 that inputs into the block 406).

At a block 408, the helper session associated with the head fragment is created. In one embodiment, information from the session pointer data structure can be used to populate the helper session, including source and destination IP addresses, source and destination port addresses, IP identifiers to match fragments that belong together, session information to match fragments to the same session, network address translation (NAT) results, and so forth.

At a block 410, any corresponding non-head fragments that are stored in the storage medium 206 are updated using the session pointer data structure information as obtained from the helper session. In one embodiment and as described above, this update can include overwriting fields of the non-head fragments with destination addresses, adding routing tags, or providing other routing information. At a block 412, the non-head and head fragments are forwarded to their next destination, where they can be reassembled.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

For example, embodiments have been described herein in terms of head and non-head fragments, in that some fragments may contain substantially more packet header information than other fragments. It is appreciated that one embodiment of the invention can be applied to fragmentation schemes where the same header information is duplicated into all fragments. In such an implementation, L4-L7 processing can still be performed on only one of the fragments (which is treated as the "head fragment"), while the other fragments are treated as "non-head fragments" even though they may contain substantially the same header information as the "head fragment."

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   receiving, by a network device, a packet fragment of a packet;
   determining, by said network device, if said received packet fragment is a head fragment or a non-head fragment of said packet;
   if the received packet fragment is determined to be the head fragment of said packet:
   generating, by said network device, a session associated with the head fragment;
   processing, by said network device, the head fragment to determine a destination address for said head fragment, said generated session being created to store forwarding information and having a period of time to store said forwarding information, including said determined destination address, for said packet or a fragment thereof; and
   updating, by said network device at least one non-head fragment of said packet to write said destination address, which is obtained from said generated session, into a destination address field of said at least one non-head fragment of said packet to enable said at least one non-head fragment to be forwarded to same said destination address as said head fragment; and
   forwarding said head fragment and said at least one non-head fragment to same said destination address for reassembly back into said packet at said destination address.

2. The method of claim 1 wherein said processing the head fragment includes generating, by said network device, a session pointer data structure associated with said generated session and having the destination address,
   said updating said at least one non-head fragment includes overwriting, by said network device, the destination address located from said session pointer data structure into the destination address field of said at least one non-head fragment.

3. The method of claim 1 wherein said receiving said packet fragment includes receiving, by said network device, a fragment of an Internet Protocol (IP)-fragmented packet.

4. The method of claim 1 wherein the head fragment includes all header information from said packet, and the non-head fragments include packet data from said packet.

5. The method of claim 1 wherein both the head and non-head fragments contain duplicative header information from said packet, and:
said processing the head fragment includes processing, by said network device, one of the fragments having the header information as the head fragment; and
said updating includes designating, by said network device, other ones of the fragments having the header information as non-head fragments.

6. The method of claim 1 wherein said updating further includes adding to another of the at least one non-head fragment, by said network device, a routing tag that includes said destination address obtained from said generated session, said destination address being located at a receiver end outside of an exit point of said network device.

7. The method of claim 1 wherein said processing the head fragment includes processing, by said network device, the head fragment according to at least one of Layer 4 through Layer 7 criteria.

8. A method, comprising:
if a head fragment of a packet is received, generating a session associated with the received head fragment of the packet;
determining a destination address for the received head fragment of the packet, said generated session being created to store forwarding information and having a period of time to store said forwarding information, including the determined destination address, for the packet or a fragment thereof;
updating any corresponding non-head fragment of said packet to write the determined destination address, which is obtained from said generated session, into a destination address field of the any corresponding non-head fragment of said packet;
forwarding said head fragment to said determined destination address; and
forwarding the updated any corresponding non-head fragment having the destination address field that has been written with said obtained destination address to same said determined destination address for reassembly back into said packet.

9. A method, comprising:
if a head fragment of a packet is received, generating a session associated with the received head fragment of the packet, said generated session having a period of time to store forwarding information for the packet or a fragment thereof;
applying the forwarding information obtained from the generated session, including a destination address, to any corresponding non-head fragment of said packet, said applying including overwriting a destination address field of said any corresponding non-head fragment with said obtained destination address; and
forwarding the any corresponding non-head fragment having the destination address field that has been overwritten with said obtained destination address to same said destination address as said head fragment for reassembly back into said packet.

10. An article of manufacture, comprising:
a non-transitory computer-readable medium having instructions stored thereon that are executable by a processor to handle fragments, by:
determining if a fragment of a packet is either a head fragment or a non-head fragment;
if the received packet fragment is determined to be the head fragment of said packet:
processing the head fragment to determine a destination address for said head fragment; and
updating any corresponding non-head fragment of said packet to write the destination address into a destination address field of said any corresponding non-head fragment of said packet; and
forwarding the updated any corresponding non-head fragment having the destination address field that has been written with said destination address to same said destination address as said head fragment for reassembly back into said packet.

11. The article of manufacture of claim 10 wherein the computer-readable medium further includes instructions stored thereon that are executable by said processor to handle fragments, by:
storing a plurality of corresponding non-head fragments if a session has not been generated;
generating said session, which is associated with the head fragment and which is created to store forwarding information, said generated session having a period of time to store said forwarding information, including said determined destination address, for said packet or a fragment thereof; and
said updating includes subsequently overwriting the destination address, which is obtained from said generated session, into respective destination address fields of said stored plurality of non-head fragments after the session has been generated.

12. The article of manufacture of claim 10 wherein said updating further includes applying a routing tag to other non-head fragments of the packet, wherein said routing tag specifies the destination address, which is located at a receiver end outside of an exit point of a network device that forwards the non-head and head fragments.

13. A system, comprising:
a means for determining if a fragment of a packet is either a head fragment or a non-head fragment;
a means for processing the fragment if it is determined to be a head fragment to determine a destination address for said head fragment and for generating a session associated with the head fragment, said generated session being created to store forwarding information and having a period of time to store said forwarding information, including said determined destination address, for said packet or a fragment thereof;
a means for updating any corresponding non-head fragment of said packet to write the destination address, which is obtained from said generated session, into a destination address field of said any corresponding non-head fragment of said packet; and
a means for storing a plurality of corresponding non-head fragments if the session has not been generated, and said means for updating overwrites the obtained destination address into respective destination address fields of said stored plurality of non-head fragments after the session has been generated.

14. The system of claim 13, further comprising means for forwarding said head fragment to said obtained destination address, and for forwarding the any corresponding non-head fragment having the destination address field written with the obtained destination address to same said destination address as said head fragment for reassembly back into said packet.

15. A system, comprising:
an entry point to receive packet fragments of a packet;
a storage unit to store non-head fragments of said packet that are received at the entry point; and
a network device coupled to the entry point to determine if a packet fragment received at the entry point is a head fragment of said packet, and to generate a session associated with the head fragment if the received packet fragment is determined to be the head fragment, said generated session being created to store forwarding information and having a period of time to store said forwarding information, including a destination address, for said packet or a fragment thereof,
the network device further being coupled to the storage unit to update said non-head fragments, stored at the storage unit, to write said destination address which is obtained from said generated session into respective destination address fields of said non-head fragments, and to forward said head fragment and said non-head fragments to same said destination address for reassembly back into said packet.

16. The system of claim 15 wherein the network device includes a switch to receive said fragments, which were fragmented from said packet by a router.

17. The system of claim 15, further comprising an exit point coupled to the network device, wherein the entry and exit points are included as parts of at least one software-based function.

18. The system of claim 15 wherein the network device forwards the head fragment to be processed to determine said destination address, said processing of the head fragment includes at least one from a plurality of Layer 4 through Layer 7 processing.

19. The system of claim 15 wherein the network device processes the head fragment to determine said destination address.

20. The system of claim 18, further comprising an exit point coupled to the network device and at least another network device coupled to the exit point to perform said processing of the head fragment.

21. The system of claim 15, further comprising an exit point coupled to the network device and another storage unit, coupled to the exit point, to store the destination address.

22. The system of claim 15, further comprising a software program to operate in conjunction with the network device to handle the non-head and head fragments.

23. An apparatus to handle packet fragments, the apparatus comprising:
a network device to receive a head fragment of a packet, to process the received head fragment to determine a destination address for said head fragment, and to update any corresponding non-head fragment of said packet to write the determined destination address into a destination address field of said any corresponding non-head fragment of said packet,
wherein said network device is configured to forward said head fragment and said any corresponding non-head fragment to same said destination address for reassembly back into said packet.

24. The apparatus of claim 23 wherein said network device includes a switch to receive said fragments, which were fragmented from said packet by a router.

25. The apparatus of claim 23 wherein the network device is configured to generate a session associated with the received head fragment, said generated session being created to store forwarding information and having a period of time to store said forwarding information, including storage of the determined destination address, for said packet or a fragment thereof, and wherein to further said update, the network device applies a routing tag to another corresponding non-head fragment, said routing tag specifies the stored destination address, which is located at a receiver end outside of an exit point of said network device.

26. The apparatus of claim 23 wherein said network device performs said process said head fragment according to at least one of Layer 4 through Layer 7 criteria.

27. An apparatus to handle packet fragments, the apparatus comprising:
a switch to receive a head fragment of a packet, to process the received head fragment to determine a destination address for said head fragment, and to apply the determined destination address to any corresponding non-head fragment of said packet,
said switch performs said apply by an overwrite of a destination address field of said any corresponding non-head fragment with said determined destination address, and forwards said head fragment and said any corresponding non-head fragment to same said destination address for reassembly back into said packet.

28. The apparatus of claim 27 wherein said switch performs said apply said stored destination to said any corresponding non-head fragment that is received subsequently after the head fragment is forwarded to said destination address.

29. The apparatus of claim 27 wherein said switch is configured to generate a session associated with the received head fragment, said generated session having a period of time to store forwarding information, including storage of the determined destination address, for said packet or a fragment thereof, and wherein said switch further performs application of a routing tag to another corresponding non-head fragment, said routing tag specifies the stored destination address, which is located at a receiver end outside of an exit point of said switch.

* * * * *